United States Patent [19]
Dias et al.

[11] Patent Number: 5,907,849
[45] Date of Patent: May 25, 1999

[54] METHOD AND SYSTEM FOR RECOVERY IN A PARTITIONED SHARED NOTHING DATABASE SYSTEM USING VIRTUAL SHARE DISKS

[75] Inventors: Daniel Manuel Dias, Mahopac; Anant Deep Jhingran, Elmsford; Richard Pervin King, Thornwood, all of N.Y.; Christos Polyzois, Chatham, N.J.

[73] Assignee: International Business Machines Corporation, Armonk, N.Y.

[21] Appl. No.: 08/865,156

[22] Filed: May 29, 1997

[51] Int. Cl.$^6$ ........................................................ G06F 17/00
[52] U.S. Cl. ......................... 707/202; 707/201; 707/203; 707/204
[58] Field of Search ................. 707/1–206; 398/701–710

[56] References Cited

U.S. PATENT DOCUMENTS

| | | | |
|---|---|---|---|
| 3,702,006 | 10/1972 | Page | 395/650 |
| 4,633,387 | 12/1986 | Hartung et al. | 395/650 |
| 4,769,772 | 9/1988 | Dwyer | 395/600 |
| 4,819,159 | 4/1989 | Shipley et al. | 395/182.17 |
| 4,843,541 | 6/1989 | Bean et al. | 395/856 |
| 4,853,843 | 8/1989 | Ecklund | 395/600 |
| 4,920,487 | 4/1990 | Baffes | 395/650 |
| 4,925,311 | 5/1990 | Neches et al. | 395/650 |
| 5,269,013 | 12/1993 | Abramson et al. | 395/650 |
| 5,440,727 | 8/1995 | Bhide et al. | 707/10 |
| 5,450,584 | 9/1995 | Sekiguchi et al. | 395/650 |
| 5,555,404 | 9/1996 | Torbjorsen et al. | 707/202 |
| 5,734,896 | 3/1998 | Rizvi et al. | 707/10 |
| 5,764,905 | 6/1998 | Catozzi et al. | 707/3 |

FOREIGN PATENT DOCUMENTS 62-168497   7/1987   Japan .

OTHER PUBLICATIONS

D.M. Dias, B.R. Iyer and P.S. Yu, "Hybrid Data Sharing—Function Shipping Architecture for Multi–Systems and Control"; IBM Technical Disclosure Bulletin; vol. 30, No. 10; Mar. 1988, pp. 453–454.

Y.H. Lee and P.S. Yu, "FMRT: An Efficient Transaction Routing and Load Sharing Algorithm"; IBM Technical Disclosure Bulletin; vol. 33, No. 10B; Mar. 1991, pp. 355–360.

M. Auslander, A. Chang, S. Morgan, S. Moore, J.C. O'Quin and J.T. O'Quin, "Mirroring of Data on a Partition Basis", Reproduced from Research Disclosure, Jul. 1990, No. 315; Kenneth Mason Publications Ltd., England.

(List continued on next page.)

*Primary Examiner*—Matthew M. Kim
*Assistant Examiner*—David Yiuk Jung
*Attorney, Agent, or Firm*—Heslin & Rothenberg, P.C.

[57] ABSTRACT

A method and system for recovering from a failure of a processing node in a partitioned shared nothing database processing system are provided. The processing system may include a pair of processing nodes having twin-tailed-connected thereto a storage device. A first processing node of the pair of processing nodes has a first database instance running thereon which accesses a first data partition on the storage device prior to the failure. Upon detection of the failure, access to the first data partition on the storage device is provided to a third, spare processing node through the second processing node of the pair of processing nodes. The third processing node runs a replacement database instance for the first database instance which was running on the first processing node prior to the failure thereof. The replacement database instance accesses the first data partition on the storage device through the second processing node, thereby recovering from the failure of the first processing node. Access to the first data partition may include using a virtual shared disk utility having a server portion on the second processing node and a client portion on the third processing node.

57 Claims, 4 Drawing Sheets

OTHER PUBLICATIONS

D.W. Cornell, D.M. Dias and P.S. Yu, "On Multisystem Coupling Through Function Request Shipping," IEEE Transactions on Software Engineering, vol. SE–12, No. 10, Oct. 1986, pp. 1006–1017.

P.S. Yu, D. Cornell, D.M. Dias and A. Thomasian, "Performance Comparison of IO Shipping and Database Call Shipping: Schemes in Multisystem Partitioned Databases," North–Holland Performance Evaluation 10 (1989), pp. 15–33.

J.L. Wolf, D.M. Dias, B.R. Iyer and P.S. Yu, "Multisystem Coupling by a Combination of Data Sharing and Data Partitioning," IEEE Transactions on Engineering, vol. 15, No. 7, Jul. 1989, pp. 854–860.

fig. 1 fig. 2 fig. 3 fig. 4 fig. 5 fig. 6

METHOD AND SYSTEM FOR RECOVERY IN A PARTITIONED SHARED NOTHING DATABASE SYSTEM USING VIRTUAL SHARE DISKS

RELATED APPLICATION INFORMATION

This application relates to the following commonly assigned U.S. Patent Applications: "METHOD AND SYSTEM FOR DATABASE LOAD BALANCING", Ser. No. 08/332,323, now U.S. Pat. No. 5,625,811 filed on Oct. 31, 1994 and "APPLICATION-TRANSPARENT RECOVERY FOR VIRTUAL SHARED DISKS", Ser. No. 08/332,157, filed on Oct. 31, 1994.

Each of these Applications is hereby incorporated by reference herein in its entirety.

TECHNICAL FIELD

This invention relates to computer database processing systems. More particularly, this invention relates to recovery from a processing node failure in a shared nothing database processing system.

BACKGROUND OF THE INVENTION

Modern computer systems often involve multiple, individual processors or nodes which are interconnected via a communication network. Large amounts of information are often stored and processed in such systems. In addition to processing equipment, each node typically has digital storage devices (e.g., magnetic disks) for storing the information. The information is often arranged as a database that occupies the available storage space at the various nodes in the system.

The techniques employed for arranging the required storage of, and access to a database in a computer system with multiple nodes are dependent on the requirements for the specific system. However, certain requirements are common to most systems. All data in the database should be available for access from any node in the system. The amount of storage overhead and processing overhead must be kept at a minimum to allow the system to operate efficiently, and the storage/access strategy must generally be immune to failure occurring at any one node.

Two general techniques for database storage, or partitioning, are employed in modern systems. The first, data sharing, involves providing physical access to all disks from each node in the system. However, to maintain coherency of the database, global locking or change lists are necessary to ensure that no two nodes inconsistently change a portion of the database.

The second technique of data storage involves physically partitioning the data and distributing the resultant partitions to responsible or owner nodes in the system which become responsible for transactions involving their own, corresponding partitions.

This "shared nothing" architecture requires additional communication overhead to offer access to all of the data to all nodes. A requesting node must issue database requests to the owner node. The owner node then either: (i) performs the requested database request related to its corresponding partition (i.e., function shipping) or (ii) transfers the data itself to the requesting node (i.e., I/O shipping).

A problem with the shared nothing approach is the potential for failure at any one node and the resultant inability of that node to accept or process database requests relating to its partition.

Two principal methods are currently known for recovery of a node failure in a shared nothing database system: (i) asynchronous replication, where updates to the data are sent to a replica asynchronously (see e.g., "An Efficient Scheme for Providing High Availability," A. Bhide, A. Goyal, H. Hsiao and A. Jhingran, SIGMOD '92, pgs. 236–245, incorporated herein by reference); and (ii) recovery on a buddy node to which disks of the failed node are twin-tailed-connected. Twin-tailing disk units to buddy processing nodes is known in the art, and involves a physical connection between a single disk and more than one processing node. In one mode of twin-tailing, only one node is active and accesses the disk at any one time. In another mode of twin-tailing, both nodes are allowed to access the disk simultaneously, and conflict prevention/resolution protocols are provided to prevent data corruption.

The primary advantage of method (i) is that it can recover from either disk or node failures, however the primary disadvantages of this method are that data is mirrored, consuming twice the disk capacity, and the overhead involved during normal failure-free operation for propagating data to the replica. The primary advantage of method (ii) is that there is no overhead during normal operations, however the primary disadvantage is that after a failure, twice the load is imposed on the buddy node and this can lead to half the throughput for the entire cluster, because query scans or transaction function calls to the buddy node of the failed node become the bottleneck for the entire cluster.

What is required, therefore, is a technique for recovery from a processing node failure in a shared nothing database processing system, which does not incur significant processing overhead during normal operation, or storage space overhead for full data replication.

SUMMARY OF THE INVENTION

A processing node failure recovery technique is provided by the instant invention, which in one aspect relates to a method and system for recovering from a failure of a first processing node in a database processing system having a plurality of processing nodes. A first database instance is run on the first processing node prior to its failure. The first processing node and the second processing node have commonly connected thereto a first storage device for storing first data for the first database instance. After detecting a failure of the first processing node, access to the first data is provided to a third processing node through the second processing node. The first database instance is then run on the third processing node which accesses the first data on the first storage device through the second processing node. Recovery from the failure of the first processing node is therefore provided.

In a modified embodiment, the first data is copied from the first storage device to a second storage device connected to the third processing node. While running the first database instance on the third processing node, subsequent updates to the first database instance may be mirrored to the first storage device and the copied data on the second storage device. Following a restart of the first processing node, the first processing node may be designated as a spare processing node in the system for subsequent node failures.

The first storage device may comprise two storage devices each twin-tailed-connected to the first and second processing nodes.

Access to the first data through the second processing node includes using a virtual shared disk utility having a server portion on the second processing node and a client proportion on the third processing node.

Because the second processing node may also have running thereon a second database instance of its own, access to second data for the second database instance may be provided to a fourth processing node through the second processing node. In that case, the second database instance can be thereafter run on the fourth processing node by accessing the second data on the first storage device through the second processing node. The second processing node therefore would only be required to support a server portion thereon, and the database instance processing is completely offloaded from the second processing node to the third and fourth processing nodes, which have running thereon respective client portions of the virtual shared disk utility.

Additional embodiments and modifications to these techniques are disclosed herein, including recovering the first database instance on the second processing node, during which an attempt is made to restart the first processing node. If the attempting results in a successful restart, the first database instance is restarted on the first processing node. If the attempting does not result in a successful restart, the database instance is started on the second processing node, or a spare processing node, as discussed above.

The instant invention therefore provides an effective recovery technique in a shared nothing database processing system, which does not incur significant processing overhead during normal operation, or storage space overhead for full data replication.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
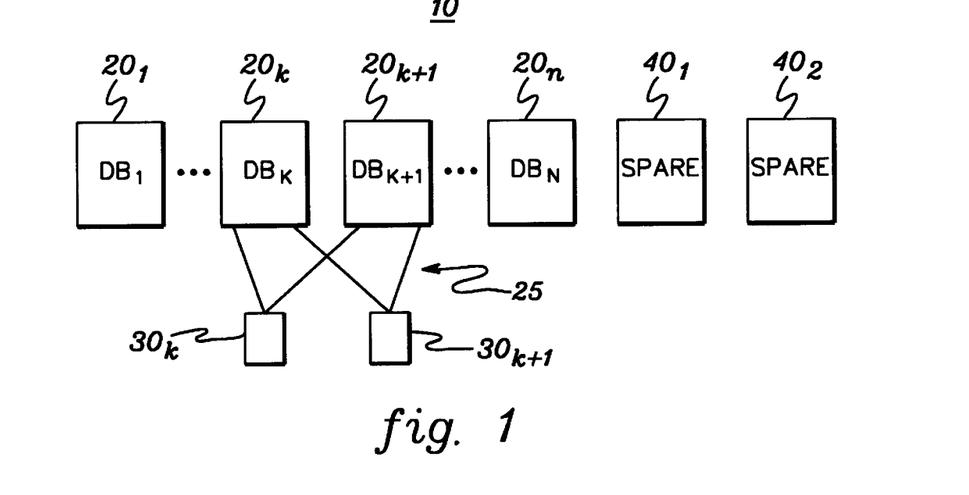
FIG. 1 depicts a database processing system having a plurality of processing nodes, two spare processing nodes, and storage devices connected to at least some of the processing nodes.

With reference to FIG. 1, a database processing system 10 is shown having a set of database processing nodes $20_1, \ldots, 20_n$ each normally running a respective database instance $DB_1, \ldots, DBN_n$. A suitable network (not shown) provides communication between the nodes. Disks $30_k$ and $30_{k+1}$ are twin-tailed-connected to buddy processing nodes $20_k$ and $20_{k+1}$ using connections 25. Shown here is an exemplary twin-tailed implementation, but in fact the disks in general can be multi-tailed connected to multiple processing nodes. FIG. 1 therefore shows node $20_k$ running a database instance $DB_k$ and its buddy node $20_{k+1}$ running database instance $DB_{k+1}$.

Under normal operation, the disks are logically partitioned among the buddy nodes, so that one node logically owns one subset of the twin-tailed disks and the buddy node the remainder. There may be on the order of tens, possibly up to hundreds, of database processing nodes. In addition, a set of spare processing nodes $40_1, 40_2$ are configured in the system. There may be at least one spare node, preferably two, and possibly more spare nodes in the system.

Figure 2:
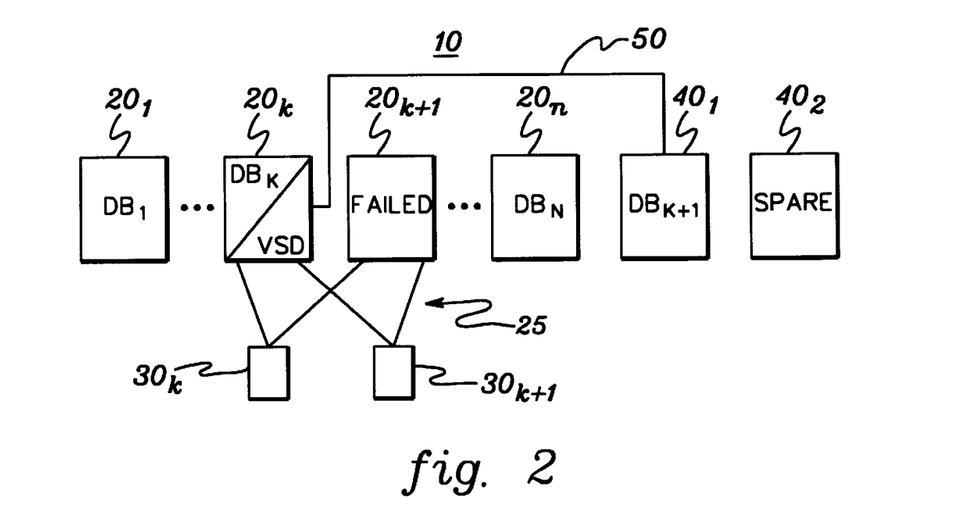
FIG. 2 depicts a first embodiment of the present invention wherein, following a node failure, a database instance is run on one of the spare processing nodes and accesses data through a virtual shared disk utility on the processing node to which is connected a storage device having data for the database instance thereon.

The technique of the present invention for recovering from a processing node failure is illustrated in FIG. 2. This figure illustrates the case when the node $20_{k+1}$ that was running database instance $DB_{k+1}$ fails. The prior art method (ii) (discussed above) would recover database instance $DB_{k+1}$ on buddy node $20_k$, so that node $20_k$ would run both of the database instances $DB_k$ and $DB_{k+1}$ after a failure. As discussed above, this could lead to twice the load on node $20_k$ with a resultant loss of performance for the entire system. FIG. 2 illustrates the disclosed technique to solve this problem: After failure, database instance $DB_{k+1}$ is run on a separate, spare node $40_1$. This database instance still needs to access the same disks that were logically assigned to it prior to the failure. As illustrated in FIG. 2, after a failure, the disks that were in the logical partition of the failed node $20_{k+1}$ are reconfigured with access through the buddy node $20_k$ via communication path 50 over a suitable communication network (not shown). This access is provided, for example, by a Recoverable Virtual Shared Disks (RVSD) utility disclosed in the above-incorporated U.S. Patent Application entitled, "Application-Transparent Recovery for Virtual Shared Disks". On failure of a node, RVSD transparently switches over to provide access to disks $30_k$ and $30_{k+1}$ via the buddy node $20_k$, from any node in the system. Following RVSD recovery, the database instance $DB_{k+1}$ that had been running on the failed node is restarted on one of the backup nodes $40_1$. Instance $DB_{k+1}$ logically owns the same disks and accesses the database partition of the failed instance by making disk read/write requests through an RVSD client portion on node $40_1$ to a server portion on node $20_k$. The RVSD utility transparently ships the requests to node $20_k$ and retrieves the proper data.

Using the technique depicted in FIG. 2, node $20_k$ has a load corresponding to the database load of instance $DB_k$ and the VSD server load supporting instance $DB_{k+1}$ on node $40_1$. This load would be less than that of recovering a full instance of $DB_1$ on node $20_k$ after a failure. Thus, with this option, the throughput after a failure will be somewhat degraded because of the dual responsibilities of node $20_k$, but this throughput is considerably more than in the prior art approaches discussed above.

Figure 3:
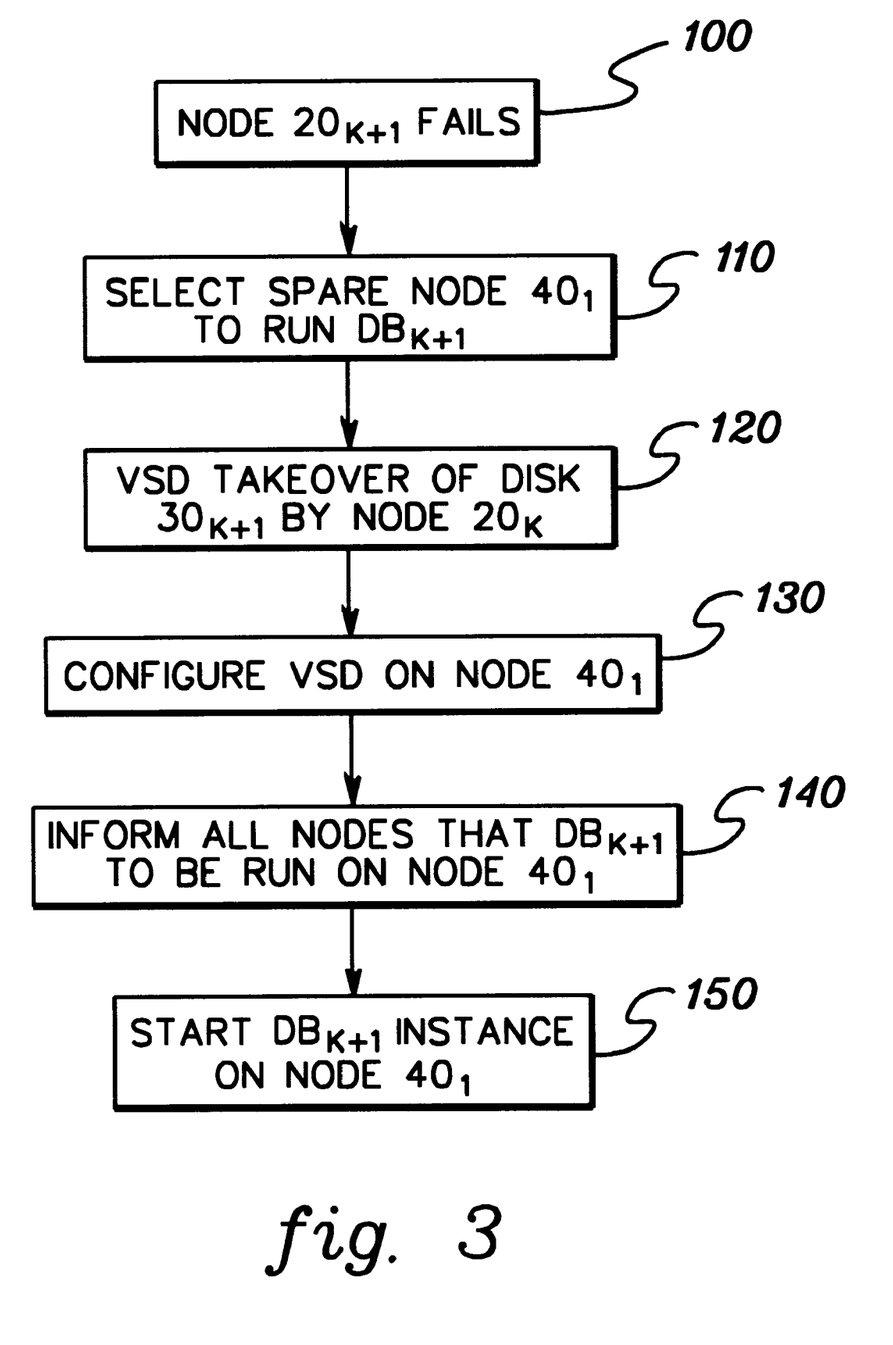
FIG. 3 is a flow diagram of the recovery steps involved following the failure of one of the nodes.

FIG. 3 is a flow diagram of the steps necessary to implement the recovery technique of FIG. 2. Following a failure of node $20_{k+1}$ in Step 100, a spare node $40_1$ is selected to run the instance $DB_{k+1}$ in Step 110. Assuming that disk $30_{k+1}$ holds the partitions relevant to instance $DB_{k+1}$, node $20_k$ performs a VSD takeover of disk $30_{k+1}$ in Step 120. A proper client portion of VSD is configured on node $40_1$ in Step 130. In Step 140, all other nodes are then informed (via update of the appropriate tables on the system) that instance $DB_{k+1}$ will now be running on node $40_1$. Therefore, all relevant requests for database instance $DB_{k+1}$ will be directed to node $40_1$. Finally, in Step 150, instance $DB_{k+1}$ is started on node $40_1$.

Figure 4:
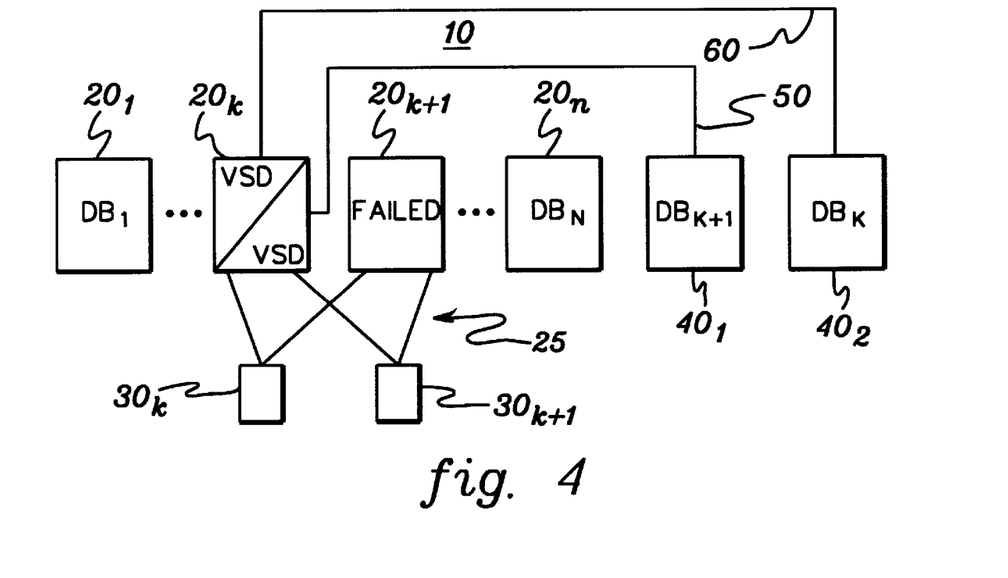
FIG. 4 is a modified embodiment of the present invention wherein two database instances are run on two respective spare processing nodes, each accessing a virtual shared disk server on another processing node to which is connected a storage device having data for the two database instances.

A modified embodiment of the present invention is depicted in FIG. 4. FIG. 4 shows database instance DBk also being restarted on another spare node $40_2$, with remote VSD access to its data via path 60 through node $20_k$. By running both database instances $DB_k$ and $DB_{k+1}$ on spare nodes $40_2$ and $40_1$, the load on node $20_k$ is only that required to handle the VSD accesses from both of these instances. Measurements indicate that, with this configuration, the VSD load on node $20_k$ is likely to be less than that for normal operation. Further, sequential access throughput over VSD is very close to the sequential access throughput of a local disk, and random access throughput can also be sustained by VSD. Therefore, this configuration will lead to performance after failure of node $20_{k+1}$ very close to normal performance. However, one trade-off is that moving database instance $DB_k$ may entail bringing down that instance and restarting it on the spare node. The impact of this depends on the workload. For decision support, failure of node $20_{k+1}$ will likely impact most, if not all, of the running queries; thus, bringing down and restarting $DB_k$ as well will likely be acceptable. For OLTP, this choice will depend on the fraction of the workload impacted by node $20_k$ failure versus the impact if both nodes $20_k$ and $20_{k+1}$ are brought down on failure.

Figure 5:
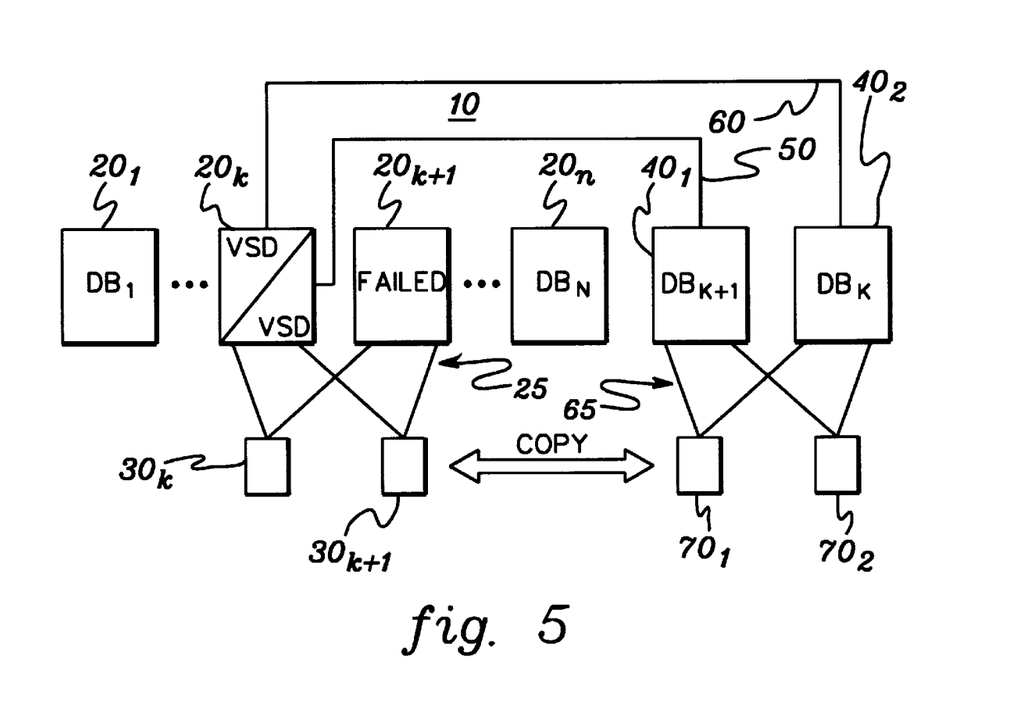
FIG. 5 is yet another modified embodiment of the present invention in which a copy is made of the data to storage devices on the formerly spare processing nodes to support recovery from future node failures.

One potential problem with this technique is handling reintegration after node $20_{k+1}$ comes back up. In the simplest case, node $20_{k+1}$ may have failed due to an operating system crash, and a mere reboot may bring it back up. Ideally, one would like to restore the system to a configuration that can handle a subsequent failure (i.e., a mode which has enough spare nodes designated). One alternative is to move database instances $DB_k$ and $DB_{k+1}$ back to nodes $20_k$ and $20_{k+1}$ respectively. However, this typically requires bringing down the database instances and then restarting them at the original nodes. An extension to the technique disclosed herein that handles reintegration without bringing down the database instances involves copying the data from disks $30_k$ and $30_{k+1}$ to twin-tailed (65) disks $70_1$ and $70_2$ on the spare nodes. This can be done concurrently with database operation after failure reconfiguration. By access through VSD the data can be mirrored to twin-tailed disks on the spare nodes, and any concurrent updates to the disks must be mirrored at both node $20_k$ and the formerly spare nodes $40_1$ and $40_2$. Those skilled in the art will readily appreciate that this can be accomplished by appropriate synchronization. Nodes $20_k$ and $20_{k+1}$ can thereafter be designated as spare nodes in the system for recovering from future failures of other nodes.

Figure 6:
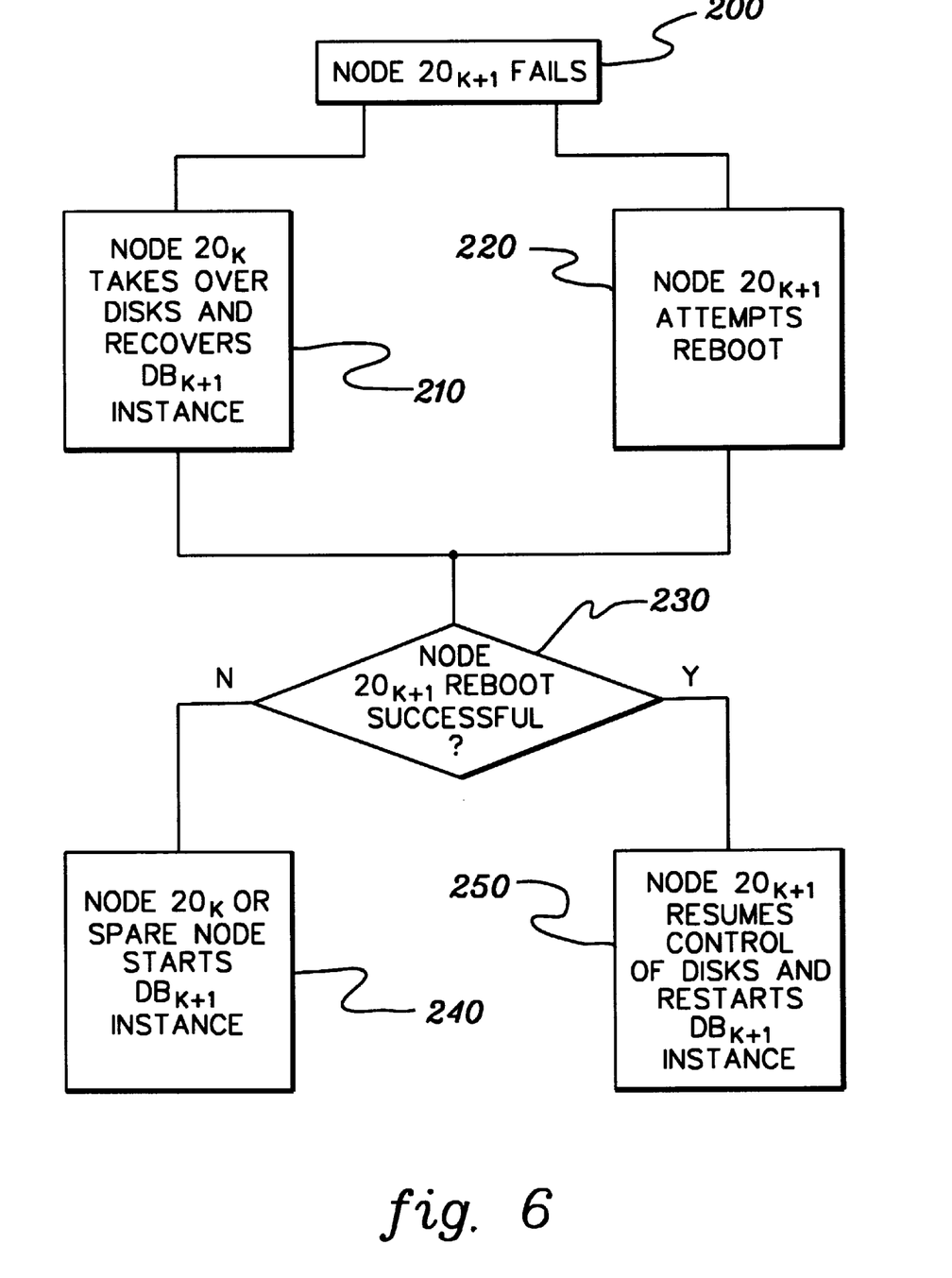
FIG. 6 is a flow diagram depicting yet another modified embodiment of the present invention wherein an attempt to reboot the failed node is accompanied by a simultaneous recovery of the database instance.

As mentioned above, a mere reboot may suffice to restore the failed node $20_{k+1}$ to working condition. In such a case, it may be desirable to avoid takeover altogether. However, this requires deferring the takeover decision until after the failed node has been restarted and has attempted to reboot, which increases recovery time accordingly. The following technique depicted in the flow diagram of FIG. 6 can be used to overlap recovery actions with the attempted reboot of the failed node. When node $20_k$ fails (Step 200), its buddy node $20_k$ takes over its disks and initiates recovery, i.e., performs file system recovery and log-based database instance recovery (Step 210). During this recovery period, the failed node $20_{k+1}$ can attempt to reboot (Step 220). If it succeeds (Decision 230, "Y"), it resumes control of its original disks and restarts a database instance locally (Step 250). If it fails to reboot (Decision 230, "N"), the database instance is started on the buddy node $20_k$ or on a spare node, as discussed above (Step 240). In all cases, restart of the database instance is immediate, since recovery of the disks has already been performed by the buddy node $20_k$.

The techniques of the instant invention are applicable to database processing systems, and in particular to any partitioned (shared nothing) database systems.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While the invention has been particularly shown and described with reference to preferred embodiment(s) thereof, it will be understood by those skilled in the art that various changes in form and details may be made therein without departing from the spirit and scope of the invention.

What is claimed is:

1. A method for recovering from a failure of a first processing node in a database processing system having a plurality of processing nodes, comprising:

running a first database instance on the first processing node, the first processing node and a second processing node having commonly connected thereto at least one first storage device for storing first data for the first database instance;

detecting a failure of the first processing node;

providing, to a third processing node, access to the first data on the at least one storage device through the second processing node; and running the first database instance on the third processing node, including accessing the first data on the at least one first storage device through the second processing node, thereby recovering from the failure of the first processing node.

2. The method of claim 1, further comprising:

copying the first data from the at least one first storage device to at least one second storage device connected to the third processing node;

wherein said running the first database instance on the third processing node includes mirroring subsequent updates to the first database instance to the first data on the at least one first storage device and the copied first data on the at least one second storage device.

3. The method of claim 2, further comprising, after a restart of the first processing node:

designating the first processing node as a first spare processing node in the database processing system.

4. The method of claim 1, wherein the at least one first storage device comprises two storage devices each twin-tailed-connected to the first and second processing nodes.

5. The method of claim 1, wherein the at least one first storage device comprises multiple storage devices each multi-tailed-connected to the first, second and other processing nodes in the database processing system.

6. The method of claim 1, wherein the first data comprises a partition of a partitioned shared nothing database resident on the database processing system.

7. The method of claim 1, wherein said providing, to the third processing node, access to the first data includes using a Virtual Shared Disk utility having a server portion on the second processing node and a client portion on the third processing node.

8. The method of claim 1, wherein the third processing node is a designated spare processing node in the database processing system.

9. The method of claim 1, further comprising:
prior to said detecting the failure of the first processing node, running a second database instance on the second processing node, the at least one first storage device having stored therein second data for the second database instance; and
after said detecting the failure of the first processing node:
providing, to a fourth processing node, access to the second data on the at least one first storage device through the second processing node, and
running the second database instance on the fourth processing node including accessing the second data on the at least one first storage device through the second processing node.

10. The method of claim 9, further comprising:
copying the first data and the second data from the at least one first storage device to at least one second storage device commonly connected to the third and fourth processing nodes;
wherein said running the first database instance on the third processing node includes mirroring subsequent updates to the first database instance to the first data on the at least one first storage device and to the copied first data on the at least one second storage device; and
wherein said running the second database instance on the fourth processing node includes mirroring subsequent updates to the second database instance to the second data on the at least one first storage device and to the copied second data on the at least one second storage device.

11. The method of claim 10, further comprising, after a restart of the first processing node:
designating the first processing node as a first spare processing node in the database processing system; and
designating the second processing node as a second spare processing node in the database processing system.

12. The method of claim 9, wherein the at least one first storage device comprises two storage devices each twin-tailed-connected to the first and second processing nodes.

13. The method of claim 9, wherein the at least one first storage device comprises multiple storage devices each multi-tailed-connected to the first, second and other processing nodes in the database processing system.

14. The method of claim 9, wherein the first and second data each comprise respective partitions of a partitioned shared nothing database resident on the database processing system.

15. The method of claim 9, wherein said providing, to the fourth processing node, access to the second data includes using a Virtual Shared Disk utility having a server portion on the second processing node and a first client portion on the fourth processing node.

16. The method of claim 15, wherein said providing, to the third processing node, access to the first data includes using the Virtual Shared Disk utility having the server portion on the second processing node and a second client portion on the third processing node.

17. The method of claim 10, wherein the third processing node and the fourth processing node are designated spare processing nodes in the database processing system.

18. A method for recovering from a failure of a first processing node in a database processing system having a plurality of processing nodes, comprising:

running a first database instance on the first processing node, the first processing node and a second processing node having commonly connected thereto at least one storage device for storing first data for the first database instance;
detecting a failure of the first processing node;
performing database recovery of the first database instance on the second processing node including accessing the first data on the at least one storage device through the second processing node;
during said performing database recovery, attempting to restart the first processing node; and
if said attempting results in a successful restart of the first processing node, thereafter restarting the first database instance on the first processing node including accessing the first data on the at least one storage device through the first processing node, or
if said attempting does not result in a successful restart of the first processing node, thereafter running the first database instance on the second processing node including accessing the first data on the at least one storage device through the second processing node, thereby recovering from the failure of the first processing node.

19. The method of claim 18, wherein the at least one storage device comprises two storage devices each twin-tailed-connected to the first and second processing nodes.

20. The method of claim 18, wherein the at least one storage device comprises multiple storage devices each multi-tailed-connected to the first, second and other processing nodes in the database processing system.

21. The method of claim 18, wherein the first data comprises a partition of a partitioned shared nothing database resident on the database processing system.

22. A method for recovering from a failure of a first processing node in a database processing system having a plurality of processing nodes, comprising:
running a first database instance on the first processing node, the first processing node and a second processing node having commonly connected thereto at least one storage device for storing first data for the first database instance;
detecting a failure of the first processing node;
performing database recovery of the first database instance on the second processing node including accessing the first data on the at least one storage device through the second processing node;
during said performing database recovery, attempting to restart the first processing node; and
if said attempting results in a successful restart of the first processing node, thereafter restarting the first database instance on the first processing node including accessing the first data on the at least one storage device through the first processing node, or
if said attempting does not result in a successful restart of the first processing node, thereafter:
providing, to a third processing node, access to the first data on the at least one storage device through the second processing node, and
running the first database instance on the third processing node, including accessing the first data on the at least one storage device through the second processing node, thereby recovering from the failure of the first processing node.

23. The method of claim 22, wherein the at least one storage device comprises two storage devices each twin-tailed-connected to the first and second processing nodes.

24. The method of claim 22, wherein the at least one storage device comprises multiple storage devices each multi-tailed-connected to the first, second and other processing nodes in the database processing system.

25. The method of claim 22, wherein the first data comprises a partition of a partitioned shared nothing database resident on the database processing system.

26. The method of claim 22, wherein said providing, to the third processing node, access to the first data includes using a Virtual Shared Disk utility having a server portion on the second processing node and a client portion on the third processing node.

27. The method of claim 22, wherein the third processing node is a designated spare processing node in the database processing system.

28. In a partitioned shared nothing database processing system, a method for recovering from a failure of a first processing node of a pair of processing nodes having twin-tailed-connected thereto at least one storage device, the first processing node having a first database instance running thereon and accessing a first data partition on the at least one storage device prior to the failure, the method comprising:

providing, to a third processing node, access to the first data partition on the at least one storage device through a second processing node of the pair of processing nodes; and running, on the third processing node, a first replacement database instance for the first database instance which was running on the first processing node prior to the failure thereof, including accessing the first data partition on the at least one storage device through the second processing node, thereby recovering from the failure of the first processing node.

29. The method of claim 28, wherein said providing, to the third processing node, access to the first data partition includes using a Virtual Shared Disk utility having a server portion on the second processing node and a first client portion on the third processing node.

30. The method of claim 29, wherein the second node had a second database instance running thereon and accessing a second data partition on the at least one storage device prior to the failure of the first processing node, the method further comprising:

providing, to a fourth processing node, access to the second data partition on the at least one storage device through the second processing node; and running, on the fourth processing node, a second replacement database instance for the second database instance which was running on the second processing node prior to the failure of the first processing node, including accessing the second data partition on the at least one storage device through the second processing node.

31. The method of claim 30, wherein said providing, to the fourth processing node, access to the second data partition includes using the Virtual Shared Disk utility having the server portion on the second processing node and a second client portion on the fourth processing node.

32. A system for recovering from a failure of a first processing node in a database processing system having a plurality of processing nodes, comprising:

means for running a first database instance on the first processing node, the first processing node and a second processing node having commonly connected thereto at least one first storage device for storing first data for the first database instance;

means for detecting a failure of the first processing node;

means for providing, to a third processing node, access to the first data on the at least one storage device through the second processing node; and means for running the first database instance on the third processing node, including means for accessing the first data on the at least one first storage device through the second processing node, thereby recovering from the failure of the first processing node.

33. The system of claim 32, wherein the at least one first storage device comprises two storage devices each twin-tailed-connected to the first and second processing nodes.

34. The system of claim 32, wherein the at least one first storage device comprises multiple storage devices each multi-tailed-connected to the first, second and other processing nodes in the database processing system.

35. The system of claim 32, wherein the first data comprises a partition of a partitioned shared nothing database resident on the database processing system.

36. The system of claim 32, wherein said means for providing, to the third processing node, access to the first data includes a Virtual Shared Disk utility having a server portion on the second processing node and a client portion on the third processing node.

37. The system of claim 32, further comprising:

means for running a second database instance on the second processing node prior to detecting the failure of the first processing node, the at least one first storage device having stored therein second data for the second database instance;

means for providing, to a fourth processing node, access to the second data on the at least one first storage device through the second processing node after detecting the failure of the first processing node; and means for running the second database instance on the fourth processing node including means for accessing the second data on the at least one first storage device through the second processing node.

38. The system of claim 37, wherein the at least one first storage device comprises two storage devices each twin-tailed-connected to the first and second processing nodes.

39. The system of claim 37, wherein the at least one first storage device comprises multiple storage devices each multi-tailed-connected to the first, second and other processing nodes in the database processing system.

40. The system of claim 37, wherein the first and second data each comprise respective partitions of a partitioned shared nothing database resident on the database processing system.

41. The system of claim 37, wherein said means for providing, to the fourth processing node, access to the second data includes a Virtual Shared Disk utility having a server portion on the second processing node and a first client portion on the fourth processing node.

42. The system of claim 41, wherein said means for providing, to the third processing node, access to the first data includes the Virtual Shared Disk utility having the server portion on the second processing node and a second client portion on the third processing node.

43. In a partitioned shared nothing database processing system, a system for recovering from a failure of a first processing node of a pair of processing nodes having twin-tailed-connected thereto at least one storage device, the first processing node having a first database instance running thereon and accessing a first data partition on the at least one storage device prior to the failure, the system comprising:

means for providing, to a third processing node, access to the first data partition on the at least one storage device through a second processing node of the pair of processing nodes; and means for running, on the third processing node, a first replacement database instance for the first database instance which was running on the first processing node prior to the failure thereof, including means for accessing the first data partition on the at least one storage device through the second processing node, thereby recovering from the failure of the first processing node.

44. The system of claim 43, wherein said means for providing, to the third processing node, access to the first data partition includes a Virtual Shared Disk utility having a server portion on the second processing node and a first client portion on the third processing node.

45. The system of claim 44, wherein the second node had a second database instance running thereon and accessing a second data partition on the at least one storage device prior to the failure of the first processing node, the system further comprising:

means for providing, to a fourth processing node, access to the second data partition on the at least one storage device through the second processing node; and means for running, on the fourth processing node, a second replacement database instance for the second database instance which was running on the second processing node prior to the failure of the first processing node, including means for accessing the second data partition on the at least one storage device through the second processing node.

46. The system of claim 45, wherein said means for providing, to the fourth processing node, access to the second data partition includes the Virtual Shared Disk utility having the server portion on the second processing node and a second client portion on the fourth processing node.

47. An article of manufacture comprising a computer usable medium having computer readable code means therein for recovering from a failure of a first processing node in a database processing system having a plurality of processing nodes, the computer readable program code means in said article of manufacture comprising:

computer readable program code means for running a first database instance on the first processing node, the first processing node and a second processing node having commonly connected thereto at least one first storage device for storing first data for the first database instance;

computer readable program code means for detecting a failure of the first processing node;

computer readable program code means for providing, to a third processing node, access to the first data on the at least one storage device through the second processing node; and computer readable program code means for running the first database instance on the third processing node, including code means for accessing the first data on the at least one first storage device through the second processing node, thereby recovering from the failure of the first processing node.

48. The article of manufacture of claim 47, wherein the first data comprises a partition of a partitioned shared nothing database resident on the database processing system.

49. The article of manufacture of claim 47, wherein said code means for providing, to the third processing node, access to the first data includes a Virtual Shared Disk utility having a server portion on the second processing node and a client portion on the third processing node.

50. The article of manufacture of claim 47, further comprising:

computer readable program code means for running a second database instance on the second processing node prior to detecting the failure of the first processing node, the at least one first storage device having stored therein second data for the second database instance;

computer readable program code means for providing, to a fourth processing node, access to the second data on the at least one first storage device through the second processing node after detecting the failure of the first processing node; and computer readable program code means for running the second database instance on the fourth processing node including code means for accessing the second data on the at least one first storage device through the second processing node.

51. The article of manufacture of claim 50, wherein the first and second data each comprise respective partitions of a partitioned shared nothing database resident on the database processing system.

52. The article of manufacture of claim 50, wherein said code means for providing, to the fourth processing node, access to the second data includes a Virtual Shared Disk utility having a server portion on the second processing node and a first client portion on the fourth processing node.

53. The article of manufacture of claim 52, wherein said code means for providing, to the third processing node, access to the first data includes the Virtual Shared Disk utility having the server portion on the second processing node and a second client portion on the third processing node.

54. An article of manufacture comprising a computer usable medium having computer readable program code means therein for recovering, in a partitioned shared nothing database system, from a failure of a first processing node of a pair of processing nodes having twin-tailed-connected thereto at least one storage device, the first processing node having a first database instance running thereon and accessing a first data partition on the at least one storage device prior to the failure, the computer readable program code means in said article of manufacture comprising:

computer readable program code means for providing, to a third processing node, access to the first data partition on the at least one storage device through a second processing node of the pair of processing nodes; and computer readable program code means for running, on the third processing node, a first replacement database instance for the first database instance which was running on the first processing node prior to the failure thereof, including code means for accessing the first data partition on the at least one storage device through the second processing node, thereby recovering from the failure of the first processing node.

55. The article of manufacture of claim 54, wherein said code means for providing, to the third processing node, access to the first data partition includes a Virtual Shared Disk utility having a server portion on the second processing node and a first client portion on the third processing node.

56. The article of manufacture of claim 55, wherein the second node had a second database instance running thereon and accessing a second data partition on the at least one storage device prior to the failure of the first processing node, the article of manufacture further comprising:

computer readable program code means for providing, to a fourth processing node, access to the second data partition on the at least one storage device through the second processing node; and computer readable program code means for running, on the fourth processing node, a second replacement database instance for the second database instance which was running on the second processing node prior to the failure of the first processing node, including code means for accessing the second data partition on the at least one storage device through the second processing node.

57. The article of manufacture of claim 56, wherein said code means for providing, to the fourth processing node, access to the second data partition includes the Virtual Shared Disk utility having the server portion on the second processing node and a second client portion on the fourth processing node.

\* \* \* \* \*